May 30, 1950     J. L. HARLAN     2,509,863
METHOD FOR PRODUCING DIVALENT METAL SULFONATES
Filed June 10, 1946
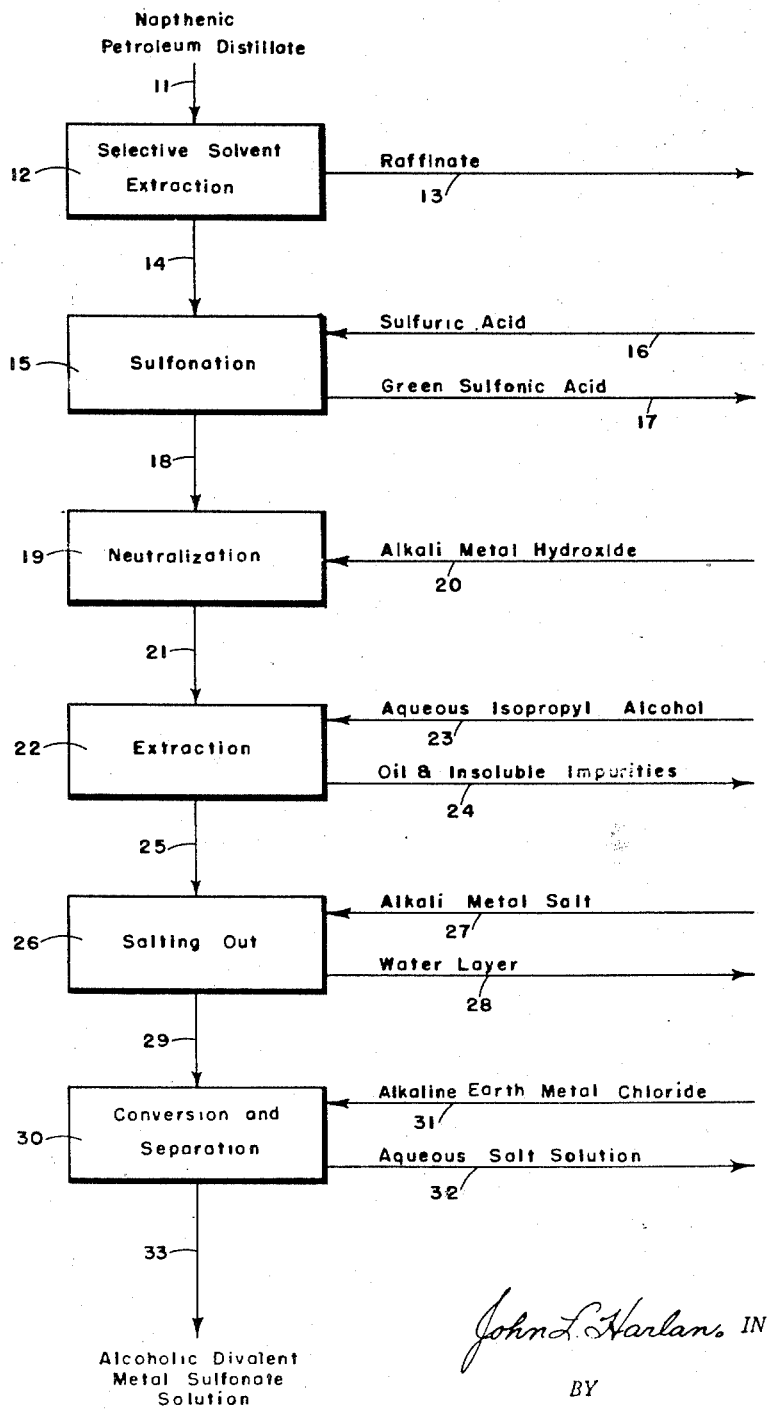

Patented May 30, 1950

2,509,863

UNITED STATES PATENT OFFICE 2,509,863

METHOD FOR PRODUCING DIVALENT METAL SULFONATES

John L. Harlan, Houston, Tex., assignor, by mesne assignments, to Standard Oil Development Company, Elizabeth, N. J., a corporation of Delaware Application June 10, 1946, Serial No. 675,810

5 Claims. (Cl. 260—504)

The present invention is directed to a method of producing alkaline earth metal salts of sulfonic acids. More particularly, the present invention is directed to a method for treating extracts from petroleum fractions to obtain therefrom substantially pure alkaline earth metal salts of sulfonic acids.

It is known to the art to treat petroleum fractions to obtain alkaline earth metal salts of sulfonic acids. In the methods usually employed for this purpose, either a relatively large number of steps are required to obtain the desired product, or else a method employing fewer steps is used and the resulting product is contaminated with substantial amounts of undesirable divalent sulfates, such as calcium sulfate.

It is an object of the present invention to obtain sulfonates of alkaline earth metals by a simple inexpensive process.

The process of the present invention may be briefly described as involving the sulfonation of a naphthenic petroleum fraction extract to obtain an acid sludge including sludge bodies and green sulfonic acids and a sulfonated oil containing mahogany sulfonic acids, the separation of the mixture of mahogany sulfonic acids and oil from the green sulfonic acids and the conversion of the mahogany sulfonic acids to salts of an alkali metal. The mixture of oil and sulfonate salts is then extracted with a solvent having the characteristics of aqueous isopropyl alcohol to remove oil therefrom and to the aqueous alcoholic solution a salt is added to cause the mixture to separate into an aqueous layer having undesirable materials dissolved therein and a partially dehydrated alcoholic layer containing desired sulfonate salts. The two layers are separated and to the partially dehydrated alcoholic layer is added a soluble salt of an alkaline earth metal to react with the sulfonates and upon settling an alcoholic layer comprising substantially pure divalent sulfonates is obtained and the aqueous layer containing undesirable divalent and alkali metal earth salts is discarded. The alcoholic layer of substantially pure divalent sulfonates is the desired product and is useful, for example, in the resolution of petroleum emulsions. It is to be pointed out that the process of the present invention involves the removal of objectionable sulfate ion from crude alkali metal sulfonate solution before the sulfonate is reacted with an alkaline earth metal. As the sulfate ion forms insoluble sulfates with the alkaline earth metals, it is essential that these ions be removed from the reaction mixture before the addition of the alkaline earth metal in order to obtain substantially pure alkaline earth metal sulfonates.

A preferred method for practicing the present invention will now be described in detail in conjunction with the drawing in which the sole figure is in the form of a diagrammatic flow sheet.

A naphthenic petroleum feed stock, such as a naphthenic lubricating oil known as 75 stock, is passed through inlet 11 to a selective solvent extraction step 12 where it is contacted with a selective solvent under conditions to form a raffinate fraction and extract fraction. The step of solvent extraction with selective solvents is well known to the art and for this reason the operating conditions in unit 12 will not be described in detail. It may be stated that a selective solvent having the characteristics of phenol or furfural is suitable for use in the solvent extraction step and that usually the extract will comprise approximately 35% of the volume of the original distillate and the raffinate will comprise approximately 65% thereof. The raffinate may be discharged from the solvent extraction unit via outlet 13. It will be understood that the unit designated by numeral 12 as the solvent extraction unit will include suitable distillation columns for the recovery of the solvent employed and that the raffinate withdrawn from the unit via line 13 and the extract removed from the unit through line 14 will be substantially free from selective solvent.

The extract is withdrawn from solvent extraction unit 12 via line 14 and sent to sulfonation unit 15. The step of sulfonating petroleum extracts is in itself well known to the art. It is desirable to conduct this step by employing sulfuric acid of approximately 98% concentration and to treat the oil with a number of portions of the sulfuric acid with the withdrawal of acid sludge including acid sludge bodies and green sulfonic acids from the sulfonated oil after each application of sulfuric acid and before the succeeding batch of acid is added to the oil. In the drawing, the sulfuric acid employed in the sulfonation step is indicated as being added to sulfonation unit 15 through inlet 16 with the acid sludge being withdrawn through outlet 17. The sulfonating step may advantageously be carried out with the naphthenic fraction and sulfuric acid initially at atmospheric temperature and the temperature allowed to increase as the reaction proceeds to a maximum within the range of 120° to 170° F. The sulfonated oil in unit 15 is usually blown with air to remove excess sulfur dioxide therefrom. The removal of excess sulfur dioxide before neutralization prevents the formation of excessive amounts of inorganic salts during the neutralization step; the blowing of the sulfonated oil to remove sulfur dioxide therefrom is well known to the art and, in order to simplify the drawing, has not been shown thereon as a separate step.

The sulfonated oil fraction, including mahogany sulfonic acids, is withdrawn from unit 15 through line 18.

The mixture of oil and sulfonic acids is passed to neutralization unit 19 where the sulfonic acids are neutralized by adding thereto a solution of an hydroxide having a metal ion which will react with the sulfonic acids to produce sulfonate soluble in the alcoholic phase. Any of the alkali metal hydroxides are suitable for this purpose but in commercial operations it will usually be advantageous to use sodium hydroxide solution. It may be pointed out that a solution of the alkali metal hydroxide must be employed; if a dry metal hydroxide is added the high ionization thereof causes sulfonate to salt out around the flakes of metal hydroxide and, by so doing, forms an enveloping film which prevents complete reaction. In the drawing solution of alkali metal hydroxide is added to neutralization unit 19 through inlet 20.

The neutralized product is withdrawn from unit 19 through outlet 21 and sent to extraction zone 22 where it is extracted with a solvent having the characteristics of aqueous isopropyl alcohol. In the drawing the aqueous isopropyl alcohol is shown entering unit 22 through inlet 23 and the inert oil and insoluble impurities are withdrawn through outlet 24.

The solution of sodium sulfonates in the mixture of alcohol and water is withdrawn from unit 22 through line 25 and is introduced into unit 26 where the alcoholic solution is salted out to form an aqueous layer and a partially dehydrated alcoholic layer. In carrying out this step, the aqueous alcoholic sulfonate solution containing dissolved alkali metal sulfonate is treated to salt out the alcohol and sulfonate from the solution. The sulfonate may be salted out by washing with a concentrated salt solution or alternatively the salt may be added in the flake or crystal form. It will be understood that the added salt increases the metal ion concentration in the aqueous phase and forces the metal sulfonate into the alcohol phase. The resultant aqueous phase contains the less soluble alkali metal sulfate and undesirable low molecular weight alkali metal sulfonates. In the drawing, the alkali metal salt is passed to unit 26 through inlet 27 and the water layer is discarded through outlet 28. It may be noted that usually it will be desirable to add the same metal ion to the salting out step as is employed in the neutralizing step. Usually it will be desirable to employ sodium chloride as the salt in the salting out step because of its availability.

The alcoholic solution of alkali metal sulfonate is removed from salting out unit 26 through line 29 to unit 30 where the sulfonates are converted into alkali earth metal sulfonates. It will usually be desirable to convert the sulfonates to calcium sulfonates and for this purpose the sulfonates in zone 30 may be treated with calcium chloride either in the form of a solid or a solution. It is preferred to employ substantially anhydrous flake calcium chloride for this purpose, but whether the calcium chloride is added in the dry form or as a solution, an excess of the theoretical amount of calcium chloride is desirable to insure a high rate of conversion of the sodium sulfonate to calcium sulfonate.

It will be understood that, if desired, a soluble salt of any of the alkali earth metals may be employed for reacting with the alkali metal sulfonate in zone 30. That is to say, salts of calcium, strontium and barium are suitable for reacting with the sulfonate.

After the salt of alkaline earth metal has been added to the solution, it is preferred to agitate the mixture for several hours and then allow to settle. Upon settling, two layers are formed and the aqueous layer, comprising soluble alkaline earth metal salt and excess alkali metal salt, is removed separately from the alcoholic solution comprising desired alkaline earth metal sulfonates. In the drawing, the salt of an alkaline earth metal is added to unit 30 through inlet 31, the aqueous salt solution is withdrawn through outlet 32 and the alcoholic alkaline earth metal sulfonate solution is withdrawn through outlet 33.

The composition obtained in the practice of this method is particularly suited for the resolution of petroleum emulsions either alone or blended with other demulsifiers well known to the art.

The following is a specific example illustrating the practice of the present invention:

*Example*

An extract obtained by extracting a Coastal oil having a viscosity of 75 Saybolt seconds at 100° F. is sulfonated and the acid sludge bodies and green sulfonic acids discarded. The acid oil remaining is blown with air to remove excess sulfur dioxide formed during the acid treatment and then neutralized with sodium hydroxide solution (40° Bé.). The sodium sulfonates are then precipitated by the addition of about 5% hot water followed by agitation. The resultant mixture of mahogany sulfonates and inert oil has the following composition: sodium sulfonate 27.6% by weight, sodium sulfate 1.4%, water 14.5%, and inert oil 56.5%. To 288 gallons of this mixture was added 72 gallons of 91% isopropanol and 72 gallons of water with mixing and settling to a temperature of 110° to 120° F. The mixture was allowed to settle over night and 126 gallons of inert oil and four gallons of interface consisting of iron salts and emulsion discarded. The 304 gallons of sodium sulfonate solution had added thereto flake sodium chloride with mixing until the sodium chloride dissolved and the mixture then allowed to settle eight hours. 75 gallons of the water phase containing sodium chloride, sodium sulfate and low molecular weight sulfonates was discarded. The alcoholic phase having a volume of 240 gallons had 220 pounds of anhydrous flake calcium chloride with mixing and the solution then allowed to settle. After settling, 108 gallons of sodium chloride and calcium chloride solution was discarded, and a yield of 142 gallons of calcium sulfonate solution obtained.

The product obtained had the following composition:

Calcium sulfonate 52% by weight
Alcohol 33% by weight
Inert oil 8% by weight
Calcium chloride solution 7% by weight
Insoluble material trace Having fully described and illustrated the practice of the present invention, what I desire to claim is:

1. A method for obtaining substantially pure metallic salts of sulfonic acids including the steps of sulfonating a naphthenic petroleum fraction to obtain a mixture of oil and mahogany sulfonic acids, neutralizing the sulfonic acids in the mixture with alkali metal hydroxide solution, extracting the neutralized mixture of mahogany sulfonic salts and oil with alcoholic solvent to form a solution of mahogany sulfonic salts in the alcoholic solvent, adding sodium chloride to the solution of mahogany sulfonic salts in the alcoholic solvent to salt out the sulfonic salts in an alcoholic layer and to form an aqueous layer, separately removing the alcoholic layer and adding alkaline earth metal salt thereto to combine with the sulfonates and form an alcoholic layer with divalent metal sulfonates therein and removing said alcoholic layer as product.

2. A method in accordance with claim 1 in which the alkaline earth metal salt is calcium chloride.

3. A method in accordance with claim 1 in which the alcoholic solvent is isopropyl alcohol and the alkaline earth metal salt is calcium chloride.

4. A method for obtaining metal sulfonates including the steps of contacting a petroleum fraction obtained as an extract when subjecting a naphthenic distillate to a solvent extracting step with sulfuric acid under sulfonating conditions to produce an acid sludge including acid sludge bodies, green sulfonic mixtures and a mixture of oil and mahogany type sulfonic acids, separately removing the mixture of oil and mahogany type sulfonic acids, adding sodium hydroxide to the mixture of oil and mahogany type sulfonic acids to neutralize said acids and form sodium salts of sulfonic acids, extracting the mixture of oil and mahogany sulfonic salts with aqueous isopropyl alcohol to dissolve the mahogany sulfonic salts, withdrawing the solution of aqueous isopropyl alcohol and mahogany sulfonic salts from the oil, and adding sodium chloride thereto to salt out a solution of mahogany sulfonic salts in an alcoholic phase, removing said mahogany sulfonic salt alcoholic phase, adding calcium chloride thereto to react with the mahogany sulfonic salt and obtaining an alcoholic calcium sulfonate phase and removing the alcoholic calcium sulfonate phase as product.

5. A method for obtaining substantially pure alkali earth metal sulfonates including the steps of sulfonating a selective solvent extract from a naphthenic petroleum fraction with sulfuric acid under sulfonation conditions to produce an acid sludge including sludge bodies and green sulfonic acids and a mixture of oil and mahogany type sulfonic acids contaminated with sulfuric acid, separating said mixture from the acid sludge, neutralizing said mixture with sodium hydroxide to convert the mahogany type sulfonic acids to sodium sulfonates and to convert the contaminating sulfuric acid to sodium sulfate, extracting the neutralized mixture with aqueous isopropyl alcohol to dissolve the mahogany sulfonic salts and the sodium sulfate from the mixture, withdrawing the solution of mahogany sulfonic salts and sodium sulfate in the aqueous isopropyl alcohol from the extracted mixture, adding sufficient sodium chloride to said solution to cause said solution to separate into an aqueous alcoholic phase containing substantially all of said mahogany sulfonic acids from said solution and containing substantially no sodium sulfate and a water phase containing substantially all of the sodium sulfate from said solution, removing said alcoholic phase and adding calcium chloride thereto in sufficient quantity to convert the sodium mahogany sulfonic salts contained therein to calcium mahogany sulfonic salts and obtaining an alcoholic calcium sulfonate phase and removing the alcoholic calcium sulfonate phase as product.

JOHN L. HARLAN.

REFERENCES CITED

The following references are of record in the file of this patent:

UNITED STATES PATENTS

| Number | Name | Date |
|---|---|---|
| 1,196,274 | Petroff | Aug. 29, 1916 |
| 1,330,624 | Divine | Feb. 10, 1920 |
| 1,387,835 | Cobb | Aug. 16, 1921 |
| 1,981,799 | Buc | Nov. 20, 1934 |
| 2,097,440 | Blumer | Nov. 2, 1937 |
| 2,304,230 | Archibald | Dec. 8, 1942 |
| 2,316,719 | Russell | Apr. 13, 1943 |
| 2,414,773 | Showalter | Jan. 21, 1947 |